United States Patent [19]
Ishizuka et al.

[11] 4,244,680
[45] Jan. 13, 1981

[54] ROTARY VANE COMPRESSOR WITH OIL SEPARATING MEANS

[75] Inventors: Yutaka Ishizuka, Konan; Shinichi Kobayashi, Higashi-Matsuyama, both of Japan

[73] Assignee: Diesel Kiki Co., Ltd., Saitama, Japan

[21] Appl. No.: 59,165

[22] Filed: Jul. 20, 1979

[30] Foreign Application Priority Data

Aug. 19, 1978 [JP] Japan ............................. 53-114024[U]

[51] Int. Cl.³ ....................... F04C 29/02; B01D 50/00
[52] U.S. Cl. ................................ 418/97; 418/DIG. 1; 55/327
[58] Field of Search ................... 418/93, 97–100, 418/DIG. 1; 62/470, 473; 55/320, 327

[56] References Cited
U.S. PATENT DOCUMENTS

| | | | |
|---|---|---|---|
| 2,049,211 | 7/1936 | Loweke | 418/97 |
| 3,258,198 | 6/1966 | Harlin | 418/93 |
| 3,385,513 | 5/1968 | Kilgore | 418/98 |

FOREIGN PATENT DOCUMENTS 565690  8/1977  U.S.S.R. ............................. 55/327

Primary Examiner—John J. Vrablik
Attorney, Agent, or Firm—Frishauf, Holtz, Goodman and Woodward

[57] ABSTRACT

An improved vane compressor including a novel lubricating oil separator disposed within a discharge pressure chamber formed between the casing and the pump housing. The oil separator comprises a pair of fluid-traversable upper and lower plates disposed within the discharge pressure chamber, an oil separating element interposed between said upper and lower plates, which preferably has a reticulate or spongy structure having pores communicating with each other, and a hollow cylindrical guide element fitted in the casing in a fashion covering the inner peripheral wall of the discharge pressure chamber but a lower part thereof, said guide element having a depression formed in a peripheral surface thereof and defining a passage for guiding a gaseous medium toward the compressor outlet, whereby oil separation takes place at multiple places, resulting in high rate of oil separation.

6 Claims, 6 Drawing Figures

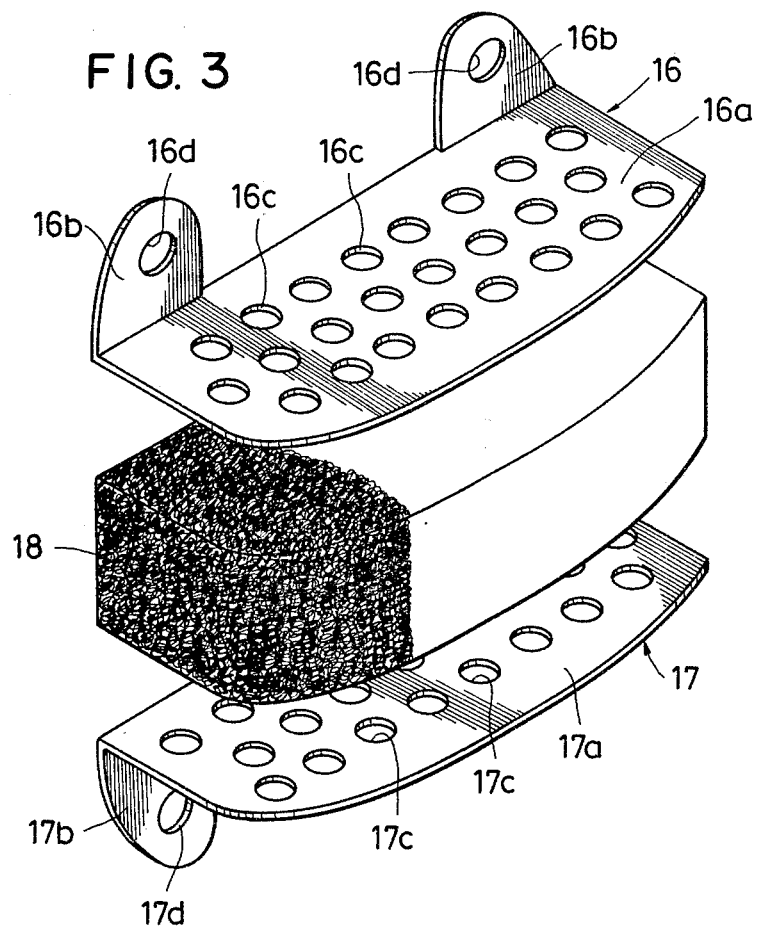
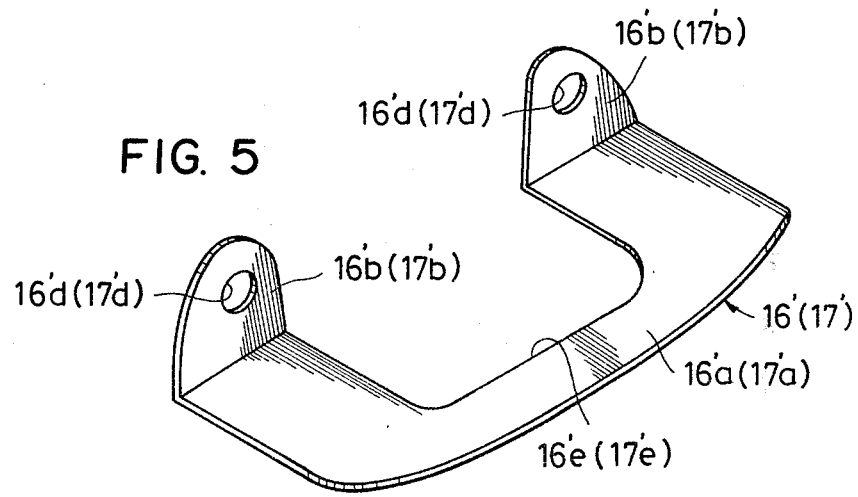

ROTARY VANE COMPRESSOR WITH OIL SEPARATING MEANS

BACKGROUND OF THE INVENTION

The present invention relates to a vane compressor for compressing a gaseous medium such as refrigerant, and more particularly to improvements in or to an oil separator for removing oil contained in the gaseous medium.

A vane compressor is already known e.g., from U.S. Pat. Nos. 2,522,824 and 3,834,846 which is of the type including a rotary shaft arranged to be rotated by an associated prime mover; a rotor secured to said rotary shaft for rotation in unison therewith and having a plurality of slits formed in an outer peripheral surface thereof; a plurality of vanes radially movably inserted in said slits; and a pump housing having its interior formed as an endless cam surface and accommodating said rotor and said vanes, the rotor, the vanes and the pump housing cooperating to define pump working chambers between them; a casing enclosing said pump housing in a fashion defining a discharge pressure chamber between the pump housing and the casing, whereby rotation of the rotor causes a gaseous medium such as refrigerant introduced into the pump working chambers to be pressurized for delivery outside the casing via the discharge pressure chamber.

The gaseous medium contains an oil dispersed therein in the form of fine particles for lubricating the sliding machine parts of the compressor such as bearings. The lubricating oil is discharged from the compressor together with the gaseous medium and is fed to an evaporator and a condenser associated with the compressor. Some of the lubricating oil stays in the evaporator and the condenser, causing a reduction in the heat transfer rate of these units. To prevent this, conventionally an oil separator is provided in the discharge pressure chamber for separating oil from the gaseous medium, storing the separated oil in the lower part of the discharge pressure chamber for recycling of the same to lubricate the sliding machine parts of the compressor.

A conventional typical type of oil separator comprises guide plates mounted on the pump housing for guiding toward the discharge pressure chamber a compressed medium pumped out through pump outlets formed in the cam ring, and a gauze member disposed in the discharge pressure chamber, whereby the compressed medium is decelerated and turned in passing the gauze member to have removed oil dispersed therein. However, such conventional type oil separator does not effectively separate oil from the gaseous medium, particularly when used in an apparatus having a high rotational speed and accordingly a high oil consumption such as a vane compressor.

BRIEF SUMMARY OF THE INVENTION

It is therefore a primary object of the invention to provide a vane compressor which has multiple oil separating regions, thereby having a very high rate of oil separation.

It is another object of the invention to provide a vane compressor in which oil separated from gaseous medium is guided to an oil reservoir formed at the bottom of the discharge pressure chamber, with certainty.

Further objects, features and advantages of the present invention will be made apparent from the ensuing description taken in connection with the accompanying drawings.

BRIEF DESCRIPTION OF THE DRAWINGS

FIG. 3 is a perspective view of the upper and lower plates and the oil separating element used in the embodiment illustrated in FIGS. 1 and 2;

FIG. 5 is a perspective view of a modified form of the plate; and

DETAILED DESCRIPTION

Figure 1:
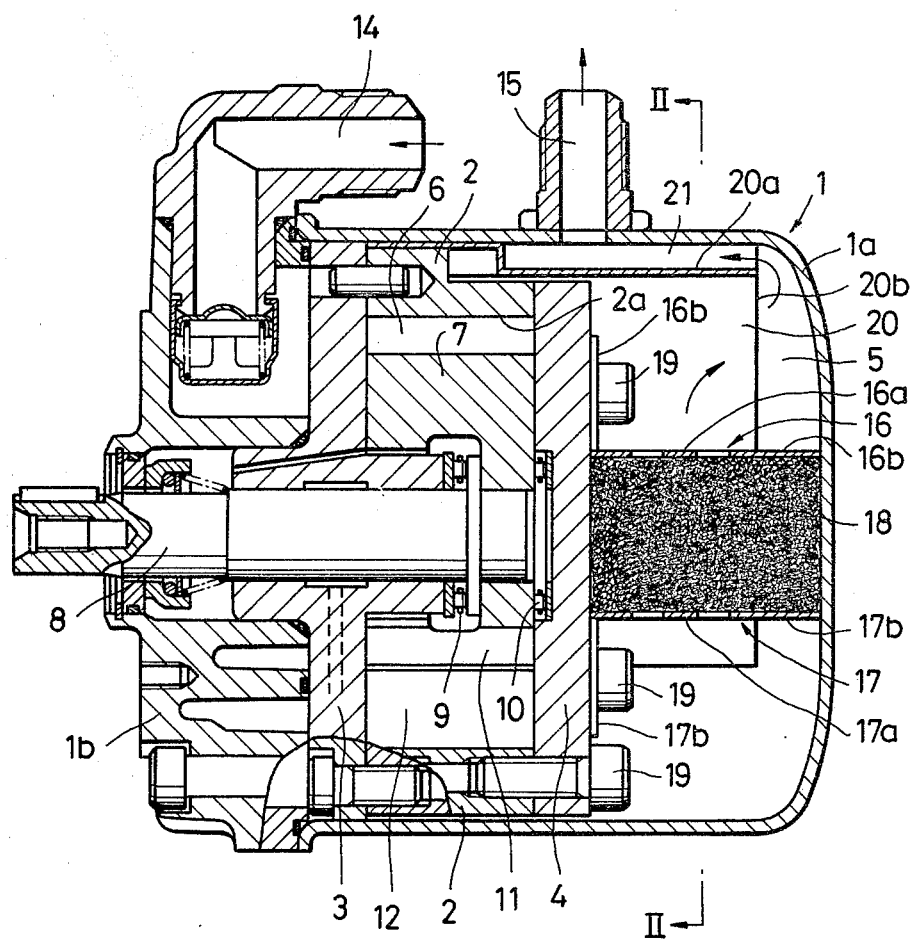
FIG. 1 is an axial sectional view of a vane compressor according to an embodiment of the present invention.
Figure 2:
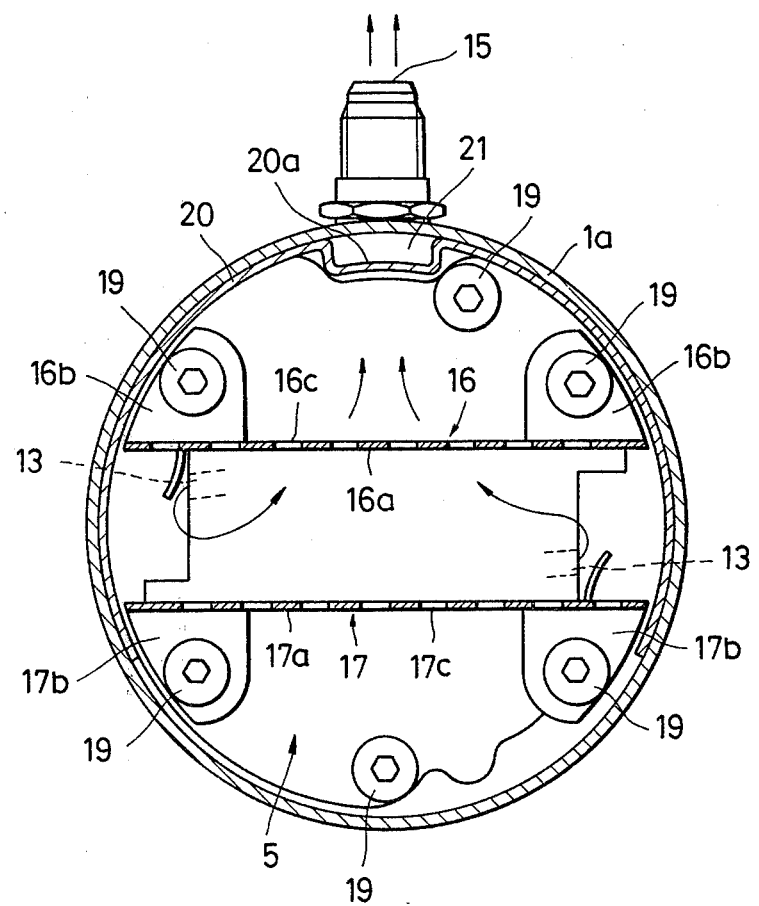
FIG. 2 is a sectional view taken along line II—II of FIG. 1 in which the oil separating element is omitted.

An embodiment of the invention will now be described with reference to the accompanying drawings.

FIGS. 1 through 4 illustrate a vane compressor according to the invention. A cylindrical cover 1a is secured to a front head 1b to form a casing 1 as a whole. The casing 1, which is horizontally disposed, accommodates a cam ring 2 having an interior thereof formed as an endless cam surface 2a of ellipsoid section. A pair of side wall members 3, 4 are secured to the opposite sides of the cam ring 2 to cooperate with the cam ring 2 to form a pump housing. A discharge pressure chamber 5 is formed between the side wall 4 and the cover 1a. A rotor 7 is disposed within a chamber 6 defined in the pump housing by the inner walls of the cam ring 2 and the side walls 3, 4. The rotor 7 is fitted on and secured to a rotary shaft 8 penetrating the front head 1b and the front side wall 3 and is kept in sliding contact with the side walls 3, 4 via respective thrust bearings 9, 10.

The rotor 7 has its peripheral lateral surface formed with a plurality of axial slits 11 radially opening and circumferentially spaced from each other at equal intervals (Only one of them is illustrated). Vanes 12 as many as slits 11 are radially movably inserted in these slits 11 (Only one of them is illustrated).

The peripheral wall of the cam ring 2 is formed with pump inlets (not illustrated) and pump outlets 13 which communicate with a compressor inlet 14 and with a compressor outlet 15 via the discharge pressure chamber 5, respectively.

Under said arrangement, when the rotary shaft 8, which is connected to the drive shaft of a prime mover, not illustrated, is rotated and accordingly the rotor 7 is also rotated, the vanes 12 carried by the rotor 7 are radially outwardly moved due to a centrifugal force produced by the rotation of the rotor 7 to urgedly slide on the inner perpheral cam surface of the cam ring 2.

Each time one of the vanes 12 passes each of the pump inlets (not illustrated) formed in the cam ring 2, a pumping chamber 6 is formed between said vane, the next or immediately following vane, the cam ring and the rotor, into which fluid is aspirated. Said chamber 13 has its volume increased from its smallest value to its largest value during its suction stroke to aspirate fluid, whereas it has its volume decreased from its largest value to its smallest value during its delivery stroke so that the fluid in the chamber 6 is pressurized to be discharged into the discharge pressure chamber 5 through a pump outlet 13. Such cyclic action is repeated, thus carrying out a pumping action.

The gaseous medium introduced into the discharge pressure chamber 5 is temporarily stored there and then is discharged through the compressor outlet 15 after having oil contained therein removed by an oil separator as hereinbelow described.

The oil separator comprises a pair of upper and lower plates 16, 17, an oil separating element 18 and a guide element 20.

The upper and lower plates 16, 17, which are of substantially the same configuration, comprises substantially horizontal holding portions 16a, 17a and each one pair of flange-like fitting portions 16b, 17b, each pair of which extend integrally from a side edge of the holding portion at right angles thereto. The horizontal holding portions 16a, 17a, which correspond in shape and size to a horizontal section of the discharge pressure chamber 5, have substantially entire surfaces thereof formed with a number of through bores 16c, 17c, while the fitting flanges 16b, 17b each have one fitting hole 16d, 17d. The plates 16, 17 are mounted on the side wall 4 in relation vertically spaced from each other, with the holes 16d, 17d penetrated by fastening bolts 19 which secure the side wall 4 to the cam ring 2. The upper plate 16 and the lower plate 17 are located above and below the pump outlets 13, respectively.

Although the plates 16, 17 are formed with fluid-traversable measures consisting of through bores 16c, 17c, the invention is not limited by such bores, but the plates may alternatively be formed with another type of fluid-traversable measures such as notches 16'e, 17'e formed in lateral edges thereof on the side of the side wall 4 as illustrated in FIG. 5.

The oil separating element 18 is interposed between the plates 16, 17 in a manner held between the horizontal portions 16a, 17a. The oil separating element 18 has a horizontal section substantially corresponding in shape and size to horizontal sections of the horizontal portions 16a, 17a of the plates 16, 17.

The oil separating element 18 should preferably be made of a material which has a reticulate or spongy porous structure in which the component pores communicate with each other. A particularly preferable material should be a filter material of a reticulate or spongy porous structure having a small pressure loss and a high rate of arrestment of dust and viscous substances, that is, a filter material in which the pores fully communicate with each other and the skeleton or framework should be composed of elements as thin as possible insofar as they have sufficient mechanical strength, thus having a high porosity. Further, the pores should be uniform in size and adjacent pores should be directed in different directions to each other so as not to form linear passages.

Most suitable for such reticulate or spongy material having continuous pores is, for instance, a porous foam composed of an organic substance such as synthetic resin, cellulose, isocyanate, particularly a porous foam having fully continuous pores obtained by removing the membranes of cells of a foam of a combustible organic substance such as soft polyurethane by a post-treatment, or a ceramic foam having completely continuous pores as disclosed e.g., in Japanese Patent Publication No. 44-13030 issued June 11, 1969, Japanese Provisional Patent Publication No. 48-66085 issued Sept. 11, 1973 and Japanese Provisional Patent Publication No. 48-81905 issued Nov. 1, 1973, which is obtained by impregnating or coating a completely continuously porous foam composed of a combustible organic substance as mentioned above with a slurry of a ceramic material, and baking the ceramic-impregnated or coated porous foam after drying it to cause the combustible organic skeleton of the porous foam to evaporate so as to obtain a ceramic skeleton composed of pipelike skeleton elements.

The guide element 20 is arranged along the inner peripheral wall of the cover 1a of the casing 1. This guide element 20 is made of a plate-like elastic material which is curved in the form of a generally hollow cylinder having a discontinuity in part of the periphery thereof to provide a longitudinal opening. The element 20, when in a free state, has a diameter slightly larger than the inside diameter of the cover 1a, so that it is fitted within the cover 1a in a fashion that its outer periphery urges the inner surface of the cover 1a by its own elastic force. The rear portion of the guide element 20 covers most of the inner peripheral surface of the discharge pressure chamber 5 but a lower part thereof, with a rear side edge 20b thereof spaced by a slight distance from the end wall surface of the discharge pressure chamber 5.

An upper outer peripheral surface of the guide element 20 is formed as a depression 20a which extends from the end edge 20b and terminates in said peripheral surface. This depression 20a is adapted to define, in cooperation with a corresponding portion of the inner peripheral surface of the cover 1a, a passage 21 for guiding gaseous medium fed from the discharge pressure chamber 5 to the compressor outlet 15.

The guide element 20 has a dual role of guiding gaseous medium fed from the discharge pressure chamber 5 to the compressor outlet 15 via the passage 21 while changing the direction of flow of the gaseous medium, and guiding separated oil to the lower part of the discharge pressure chamber 5 along its inner peripheral surface as described hereinlater.

With said arrangement, oil-containing gaseous medium enters the oil separating element 18 when introduced into the discharge pressure chamber 5, wherein it is decelerated and simultaneously has its course changed while some of the oil contained in the medium is separated. The gaseous medium thus partly deoiled then strikes against the lower surface of the horizontal portion 16a of the upper plate 16 where some of the remaining oil is removed, and then further travels upward via the through bores 16c of the upper plate 16. While, the oil removed from the gaseous medium is guided downward via the through bores 17c of the lower plate 17 and stored in the lower part of the discharge pressure chamber 5.

The gaseous medium which has passed through the through bores 16c of the upper plate 16 is forced to strike against an upper inner surface of the guide element 20 to be further decelerated, turned and deoiled. The gaseous medium thus further deoiled is then fed to the outlet 15 via the passage 21, to be discharged outside. While, the oil further removed from the gaseous medium is guided downward along the inner peripheral surface of the guide element 20 and stored in the lower part of the discharge pressure chamber 5.

Figure 6:
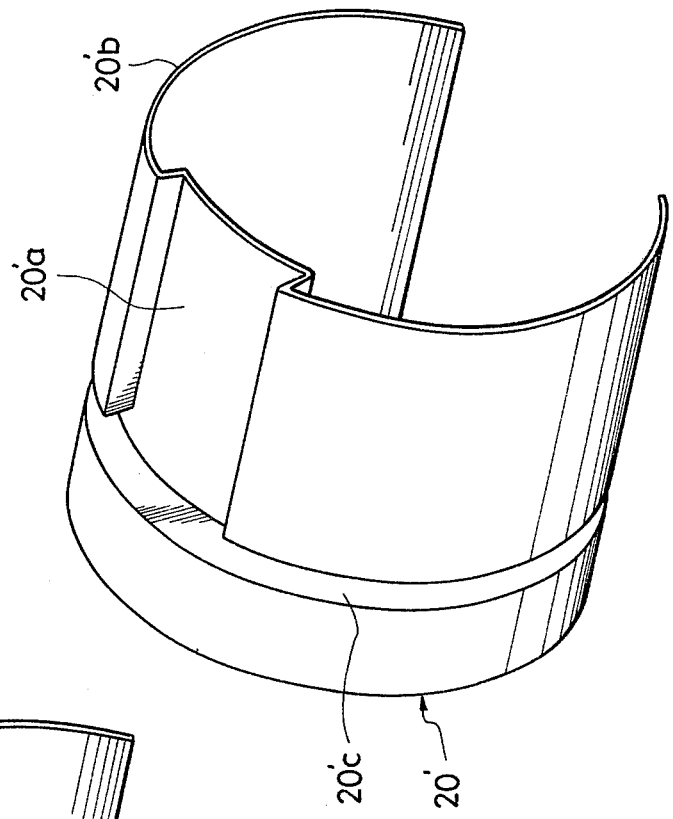
FIG. 6 is a perspective view of a modified form of the guide element.
Figure 4:
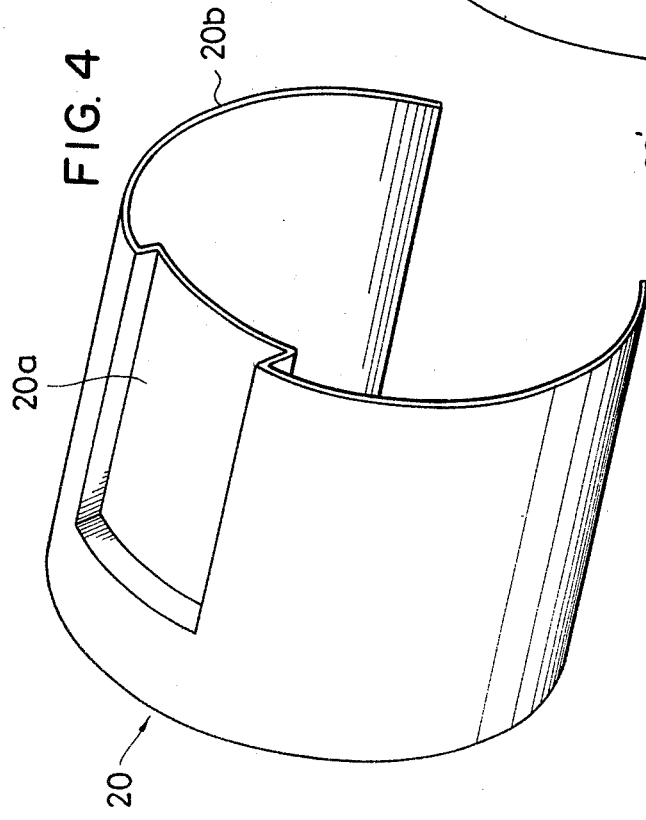
FIG. 4 is a perspective view of the guide element used in the embodiment of FIGS. 1 and 2.

FIG. 6 illustrates a modified form of the guide element 20. The guide element 20' has an annular groove 20'c circumferentially formed in the outer peripheral surface thereof. This groove 20'c communicates with the forward or inward end of the depression 20'a such that it cooperates with the inner peripheral surface of the cover 1a to define an oil passage communicating the passage 21 with the oil reservoir formed in the lower part of the discharge pressure chamber 5. When gaseous medium strikes against a lateral wall of the groove 20'c and is turned during passing from the passage 21 to the outlet 15, the oil remaining in the medium is separated, and the removed oil is certainly guided to the lower part of the discharge pressure chamber 5 along said oil passage.

As mentioned above, the structure according to the invention enables to achieve oil separation at multiple points, i. e., when gaseous medium passes the oil separating element 18, when it passes the horizontal holding portion 16a, 16'a of the upper plate 16, 16' and when it strikes against an upper inner surface of the guide element 20, 20', thus obtaining very good oil separation results.

Further, the formation of the annular groove 20'c in the outer periphery of the guide element 20' permits the oil separated from gaseous medium just before the latter passes the compressor outlet 15, to be certainly guided along the groove to the oil reservoir at the bottom of the discharge pressure chamber,5, thus obtaining more excellent oil separation results.

While a preferred embodiment of the invention has been described, such description is for illustrative purposes only, and it is to be understood that changes and variations may be made without departing from the spirit and scope of the following claims.

What is claimed is:

1. In a compressor for compressing a gaseous medium containing an oil dispersed therein, of the type including: a casing horizontally disposed; a pump housing enclosed in said casing, the pump housing having an interior thereof formed as a peripheral cam surface; a rotor journalled in said pump housing and carrying a plurality of vanes radially movably inserted in a periphery thereof; drive shaft means secured to one end of said rotor; a discharge pressure chamber defined between the casing and the pump housing; pump outlet means formed in said pump housing in communication with said discharge pressure chamber; compressor outlet means formed in an upper portion of said casing in communication with said discharge pressure chamber; and oil separator means disposed within said discharge pressure chamber for separating oil from pressurized gaseous medium delivered through said pump outlet means, the improvement wherein said oil separator means comprises: a pair of upper and lower plates which can be traversed by fluid and substantially horizontally mounted on a wall of said pump housing facing said discharge pressure chamber, in relation vertically spaced from each other; an oil separating element interposed between the upper and the lower plates; a hollow guide element of a shape generally corresponding to the inner peripheral shape of the casing, fitted in the casing in a fashion covering most of the inner peripheral wall of the discharge pressure chamber but a lower part thereof, said guide element having an outer peripheral surface facing said compressor outlet means formed as a depression extending from an end edge thereof and terminating in said peripheral surface, for defining, in cooperation with an inner peripheral surface of the casing, a passage for guiding gaseous medium fed from the discharge pressure chamber to the compressor outlet means.

2. An improved vane compressor as recited in claim 1, in which said upper and lower plates each comprise a horizontal holding portion formed with a number of through bores.

3. An improved vane compressor as recited in claim 1, in which said upper and lower plates each comprise a horizontal holding portion having a notch formed in a lateral edge thereof.

4. An improved vane compressor as recited in claim 1, in which said guide element has an annular groove circumferentially formed in an outer periphery thereof in communication with said depression, for providing an oil return passage in cooperation with an inner peripheral surface of the casing.

5. An improved vane compressor as recited in claim 1, wherein said oil separating element of said oil separator means is made of a material having a reticulate structure obtained by removing the membranes of cells of a continuously porous foam composed of a combustible organic substance.

6. An improved vane compressor as recited in claim 1, wherein said element of said oil separating element is made of a material having a reticulate structure composed of pipelike ceramic skeleton elements which has been obtained by impregnating or coating with a ceramic material a combustible organic material of a reticulate structure obtained by removing the membrane of cells of a continuously porous foam composed of a combustible organic substance, and baking the combustible organic material impregnated or coated with the ceramic material to evaporate an organic skeleton forming said combustible organic material.

* * * * *